(12) United States Patent
Gehlot (10) Patent No.: US 6,181,237 B1
(45) Date of Patent: Jan. 30, 2001

(54) METHOD AND APPARATUS FOR GENERATING PRESSURE BASED ALERTING SIGNALS

(75) Inventor: Narayan Lal Gehlot, Sayreville, NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/420,869

(22) Filed: Oct. 19, 1999

(30) Foreign Application Priority Data

Aug. 17, 1999 (MY) .......................................... PI 990 3514

(51) Int. Cl.$^7$ ........................................................ H04B 3/36
(52) U.S. Cl. ................................... 340/407.1; 340/573.1; 340/311.1; 340/539; 455/38.2; 455/567
(58) Field of Search .............................. 340/407.1, 573.1, 340/311.1, 539, 540; 455/38.2, 567

(56) References Cited

U.S. PATENT DOCUMENTS

| | | | |
|---|---|---|---|
| 3,618,070 | * 11/1971 | Kagan ................................ | 340/311.1 |
| 4,001,643 | 1/1977 | Ramberg et al. ....................... | 317/11 |
| 4,256,991 | 3/1981 | Otala .................................... | 315/104 |
| 5,007,105 | * 4/1991 | Kudoh et al. ......................... | 455/344 |
| 5,469,702 | 11/1995 | Tuma et al. ............................. | 60/311 |
| 5,583,296 | 12/1996 | Mokwa et al. .......................... | 73/718 |
| 5,652,570 | * 7/1997 | Lepkofker ........................... | 340/573.1 |
| 5,663,703 | * 9/1997 | Pearlman et al. .................. | 340/407.1 |

* cited by examiner

Primary Examiner—Julie Lieu (57) ABSTRACT

An apparatus and method for providing a pressure based alerting signal to a user to alert them as to the occurrence of a particular event. The pressure based alerting device can be implemented into jewelry, garments, or a releasable strap and includes a pressure actuator having at least one portion that is in communication with the user's skin. Upon occurrence of a predetermined event, such for example, an incoming telephone call or page, the user is silently alerted by an the application of pressure to their person generated by pressure actuator plates incorporated into the device. A subsequent action by the user, such for example, answering the incoming call or page, the pressure based alerting device reset back to an initial, non-alerting state.

19 Claims, 7 Drawing Sheets

METHOD AND APPARATUS FOR GENERATING PRESSURE BASED ALERTING SIGNALS

BACKGROUND OF THE INVENTION

1. Field of the Invention

The present invention relates to alerting devices, and more particularly to a pressure based alerting device for obtaining a user's attention upon the occurrence of an event.

2. Description of the Related Art

The use of wireless communication is increasing at an exponential rate, and as such there have been many attempts among service providers and manufacturers of the hardware implemented in the wireless systems to provide options to the users that enable more convenience and enhanced user-friendly and discrete access to the services. Among these attempts have been the implementation of alternate methods for alerting the user of the occurrence of a particular event, and more specifically the occurrence of an incoming communication signal or request. For example, with radio paging devices, the user generally has two options for setting the alert type when an incoming page is received: (i) an audible tone to indicate the presence of an incoming page, or alternatively (ii) a vibration mode to vibrate the device when the incoming page is received. The vibration mode of the radio pager serves the same intended function of obtaining the user's attention when an incoming page is received but does so in a silent, more discrete manner so as to not disturb the user or persons surrounding or proximate the user when the page is received.

Some wireless telephones provide a similar vibration mode for indicating the presence of an incoming telephone call. The vibration mode has been implemented into these devices primarily to provide the user with the option of turning off the audible tones generated by the radio pager or wireless telephone to prevent inconvenient audible disturbances in a variety of different places. Examples of such places are office meetings, libraries, movies, shows and any other location or circumstance that the user deems appropriate to eliminate the audible tones operatively generated by the respective devices.

U.S. Pat. No. 5,861,686 to Lee discloses a device for generating waking vibrations or sounds. The device is implemented into alarm watches or in communications equipment such as cellular pagers or phones. The device utilizes an electromagnet, a coil and a first and second set of vibration members in a ring case. These elements are connected to a printed circuit board (PCB) of the device (e.g. watch, phone or pager) and together enable the selective generation of vibratory motion when the device receives an incoming call or, in the case of a watch, for implementing an alarm function.

U.S. Pat. No. 5,619,181 to Murray discloses a vibratory alerting device with audible sound generator. The alerting device simultaneously generates a vibration alert and an audible alert to notify the user as to the presence of an incoming call on a portable communication device such as a pager or wireless telephone.

As mentioned previously, the use of an audible alert signal can be undesirable when the user is located in place where such a signal would be considered an intrusion or interruption. In addition, the devices heretofore used to implement a vibratory alert signal in a communication device are generally bulky in nature and have mechanical moving parts which require additional space within the device and thereby increases the size of the device.

Furthermore, all of the existing alerting devices (e.g., audible and vibratory) are contained within the communication device (i.e., phone or pager) and therefore require the user to be carrying the same in order to receive the alerting signal.

Thus, it would be advantageous to provide a more discrete alerting device that is not physically connected or disposed within the user's communication device. This would enable the user to be alerted as to the presence of an incoming communication signal without requiring them to carry the communication device.

SUMMARY OF THE INVENTION

In accordance with an embodiment of the invention, a method for generating pressure based alerting signals for alerting a user as to the occurrence of a predetermined event comprises: providing a pressure based alerting device having at least one portion in contact with the user's skin; initializing the pressure based alerting device to a predetermined pressure; setting a pressure change limit for the pressure based alerting device; changing the pressure of the at least one portion of the pressure based alerting device to notify the user of the occurrence of the predetermined event; and resetting the pressure of the at least one portion of the pressure based alerting device when the user has responded to the occurrence of the predetermined event.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1A:
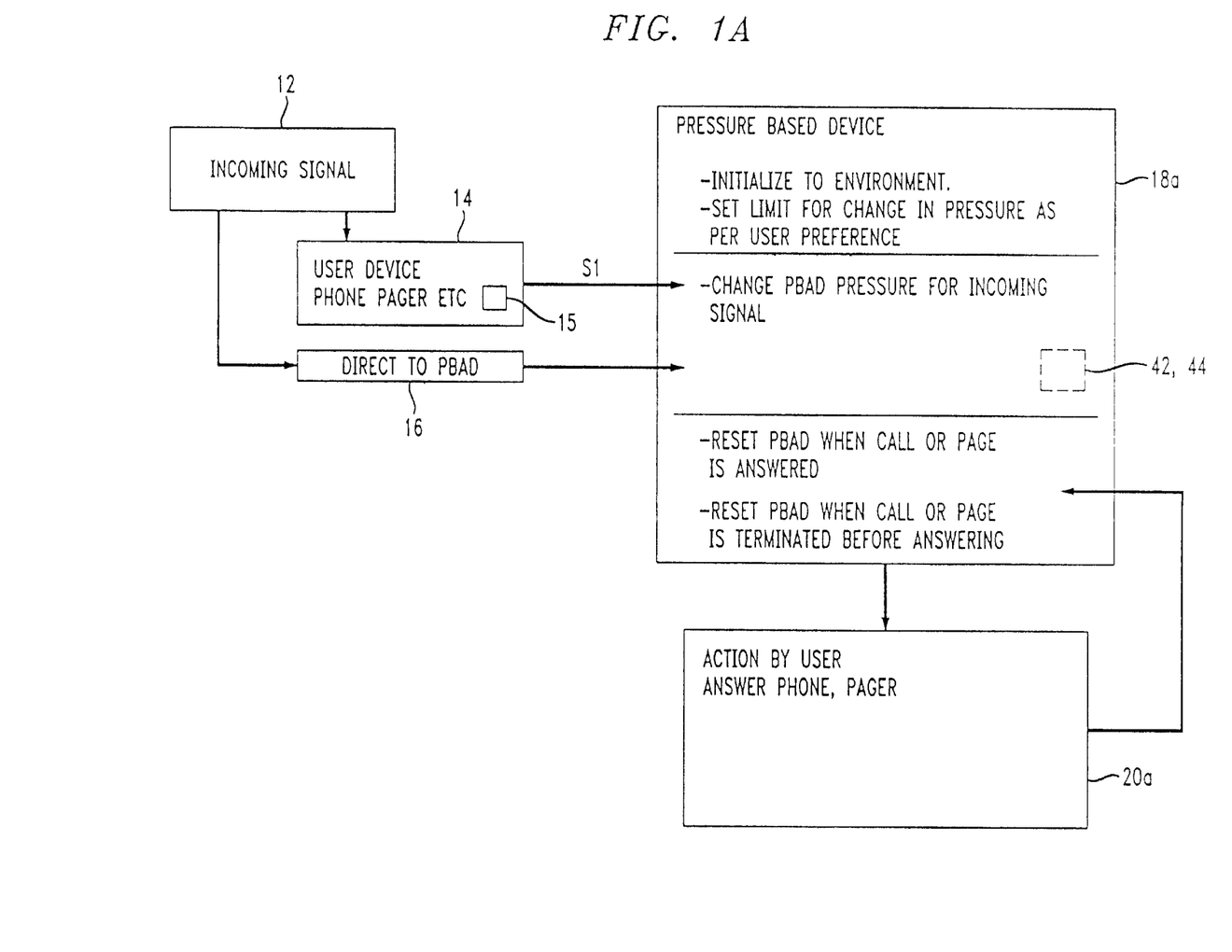
FIG. 1a is a diagrammatic representation of a method for generating pressure based alerting signals in accordance with an embodiment of the present invention.

A method for use in an illustrative apparatus shown in FIG. 1a of a pressure based alerting device according to a first embodiment of the present invention. An incoming signal 12 is received from an outside source and applied to the user device 14. The user device is a wireless device such as a pager, cellular telephone, or any other known device that receives wireless incoming signals and alerts the user upon receipt of those signals. As explained previously, this alert to the user is generally performed by providing an audible ringing signal or a mechanical vibration when the audible signal is not appropriate or desired.

User device 14 is modified to include an inserting device 15 which disables the audible ringing or paging signal upon receipt of incoming signal 12, and generates at least one predetermined signal S1, and potentially a set of predetermined signals S1, to activate pressure based device 18a. Signal S1 can for example be a pulse width modulation (PWM) signal of a fixed predetermined frequency or short pulses of the predetermined frequency. Inserting device 15 may be, for example, an oscillator circuit of an allowable non-interfering frequency using a timer chip, and signal S1 can be generated with a simple LRC combination circuit or a timer IC circuit. The signal strength of signal S1 should be sufficient to reach the pressure based alerting device which may be attached to the user's body part(s) as needed.

Inserting device 15 is shown integrated into user device 14; however, it is also contemplated that inserting device 15 can be externally provided by a separate connector capable of engaging to existing connectors on the user device, such for example is a battery charger connection, an earphone for hands free operation, and an IR port. According to an embodiment of the present invention, when an incoming signal 12 is detected by user device 14, inserting device 15 disables the ringer and generates signal S1. In another embodiment, inserting device 15 can generate signal S1 in conjunction with the audible ringing of user device 14.

Figure 7:
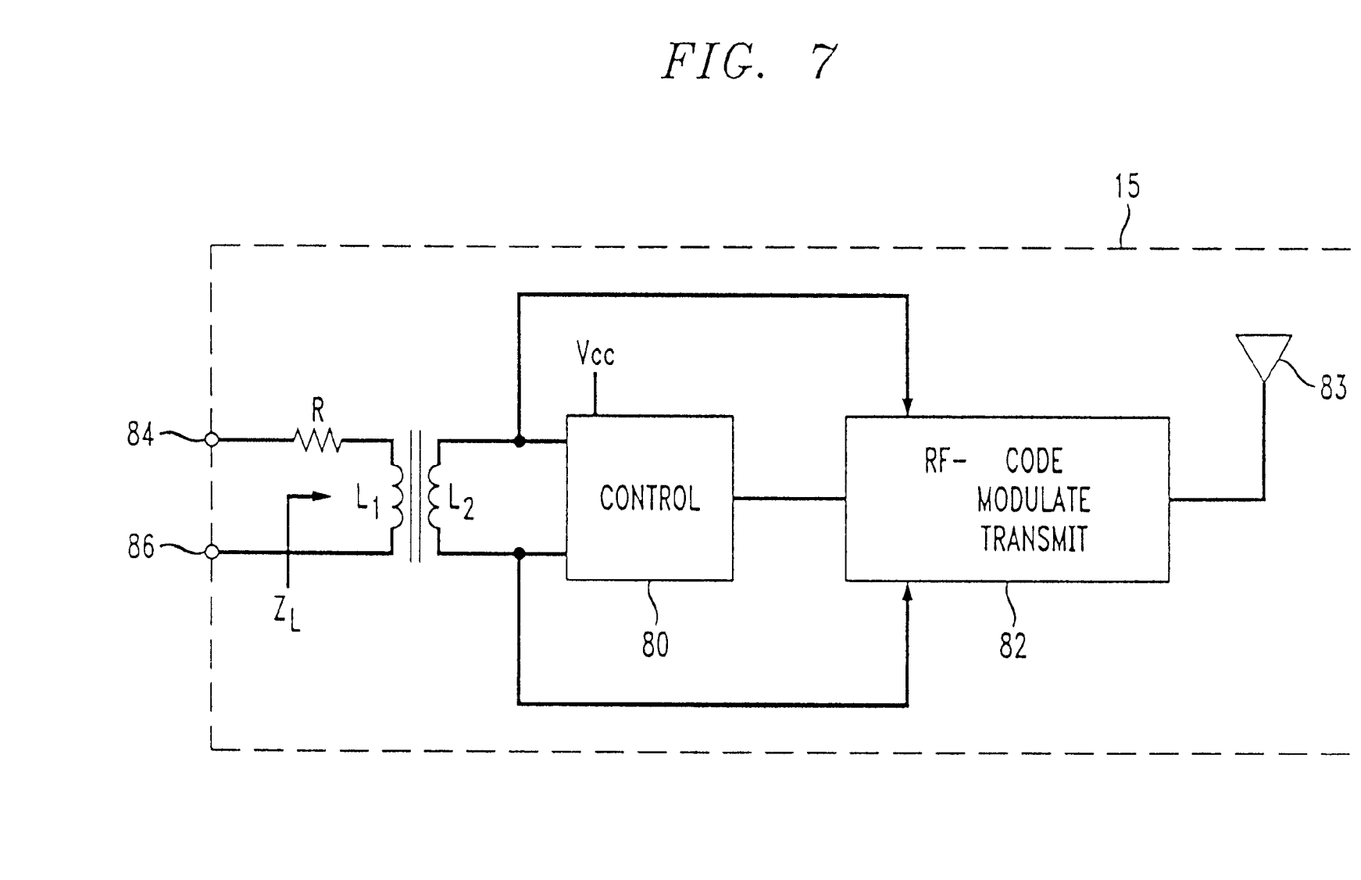
FIG. 7 is a schematic block diagram of an inserting device according to an embodiment of the present invention.

FIG. 7 shows an exemplary embodiment of inserting device 15 according to the invention. When incoming signal 12 is detected by user device 14, it is provided to inserting device 15 via terminals 84 and 86. The presence of the ringer current on terminals 84 and 86 causes an inductive coupling between inductors $L_1$ and $L_2$. When $Z_L$ is substantially equal to the impedance of the earphone, the inductive coupling causes current to flow to control 80 which electronically disables the ringer within user device 14 and further causes the RF device 82 to modulate and transmit control signal S1 via antenna 83 to the alerting device 18a. Control 80 can be any suitable known processing device. In another embodiment, control 80 can enable inserting device 15 to generate signal S1 in conjunction with the audible ringing of user device 14.

In an external example previously mentioned, terminals 84 and 86 can be mechanically coupled to an earphone jack of the user device. Generally, the mechanical coupling of a jack to the ear phone input of the user device will cause the same to mechanically disable the earphone speaker, and thereby disables the audible alert signal generated by the user device. Upon receiving incoming signal 12, the ringer current ordinarily broadcast through the earphone speaker will pass through the earphone jack and cause the inductive coupling of inductors $L_1$ and $L_2$ as described above. Thus, inserting device 15 can be added to user device that is not designed to incorporated into the same.

Figure 4A:
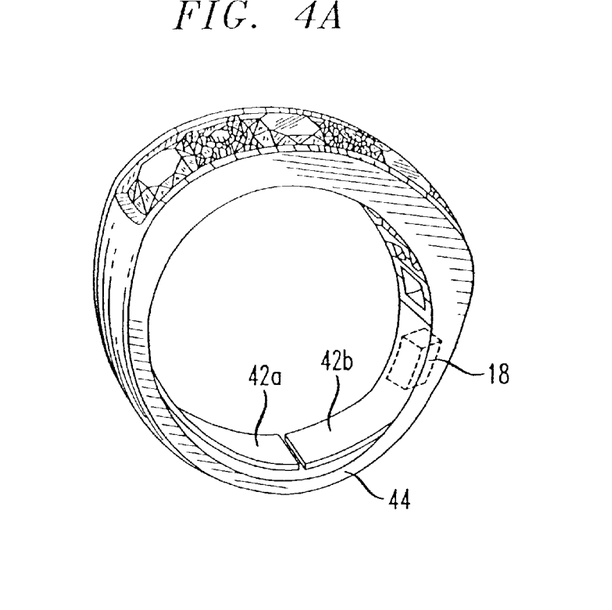
FIG. 4a is a perspective view of a jewelry ring implementing the device for generating pressure based alerting signals according to an embodiment of the present invention.
Figure 4B:
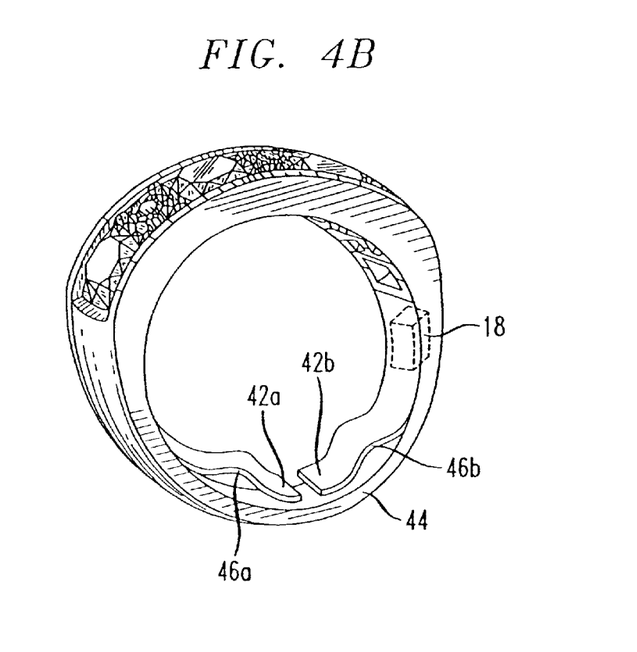
FIG. 4b is a perspective view of the jewelry ring of FIG. 4a with the device for generating pressure based alerting signals in the active state.

In accordance with another embodiment of the present invention, and referring to FIGS. 1a, 4a and 4b, a pressure based alerting device (PBAD) 18a is connected with the user device 14 via a wireless connection, such for example radio frequencies (RF). The PBAD 18a includes a bi-metal device having upper plates 42a and 42b and a lower plate portion 44 (FIG. 4). The upper plates are in physical contact with the user's person or body (preferably the user's skin) and are initially set or adjusted to a predetermined rest pressure. The rest pressure may be preset, during design or manufacture, equal to the pressure of a typical surrounding environment (i.e. no pressure) or can be dynamically set by PBAD 18a. In addition, a pressure change limit can be set based on a particular users sensitivity to the pressure applied, or may be preset according to the pressure device used.

The external disposition of PBAD 18a enables a more discrete alerting signal to be provided to the user, and provides the user with the option of not carrying user device 14, and yet continue to be alerted as to the presence of incoming communication signal 12.

In the embodiment of FIG. 1a, when incoming signal 12 is received by user device 14, the inserting device 15 disables the ringer and sends a control signal S1 to PBAD 18a. PBAD 18a generates a current signal that is fed into the upper plates 42a, 42b in contact with the user's body. The application of current into the upper plates causes them to heat up. In response to such heating, plates 42a, 42b buckle at 46a, 46b, respectively (FIG. 4b) and thereby apply physical pressure to the user's body (i.e. to the user's finger in this embodiment). The bending or buckling 46a, 46b of plates 42a and 42b is shown for exemplary purposes. The actual configuration of the buckling 46a, 46b may be different without departing from the spirit of the invention. The operation of bi-metal plates and their reactions under the application of a current or RF signals are well known in the art. The amount of variation or limit on the pressure change can be predetermined or set by the user prior to use of the PBAD 18a. Since the upper plates 42a, 42b are in physical contact with the user's person, when the pressure changes the user is thereby alerted to the presence of incoming signal 12. The user can then answer the phone or page (20a). Once the user responds to the incoming signal by either answering the call or acknowledging the incoming page, the PBAD 18a resets itself to the initially-set pressure.

In another embodiment of the present invention, the PBAD 18a is configured to directly receive (at 16) or share the incoming signal 12 with the user device 14. Thus, upon receipt of the incoming signal 12 in the form of RF energy (i.e. RF pulses generating a current), PBAD 18a can respond immediately as opposed to requiring user device 14 to generate control signal S1 via inserting device 15 to PBAD 18a to thereby indicate the presence of incoming signal 12. This alternate embodiment thus eliminates the need for user device 14 to send signal S1 to PBAD 18a after its receipt of incoming signal 12, by enabling the simultaneous receipt of the incoming signal by both the user device 14 and the PBAD 18a.

Figure 1B:
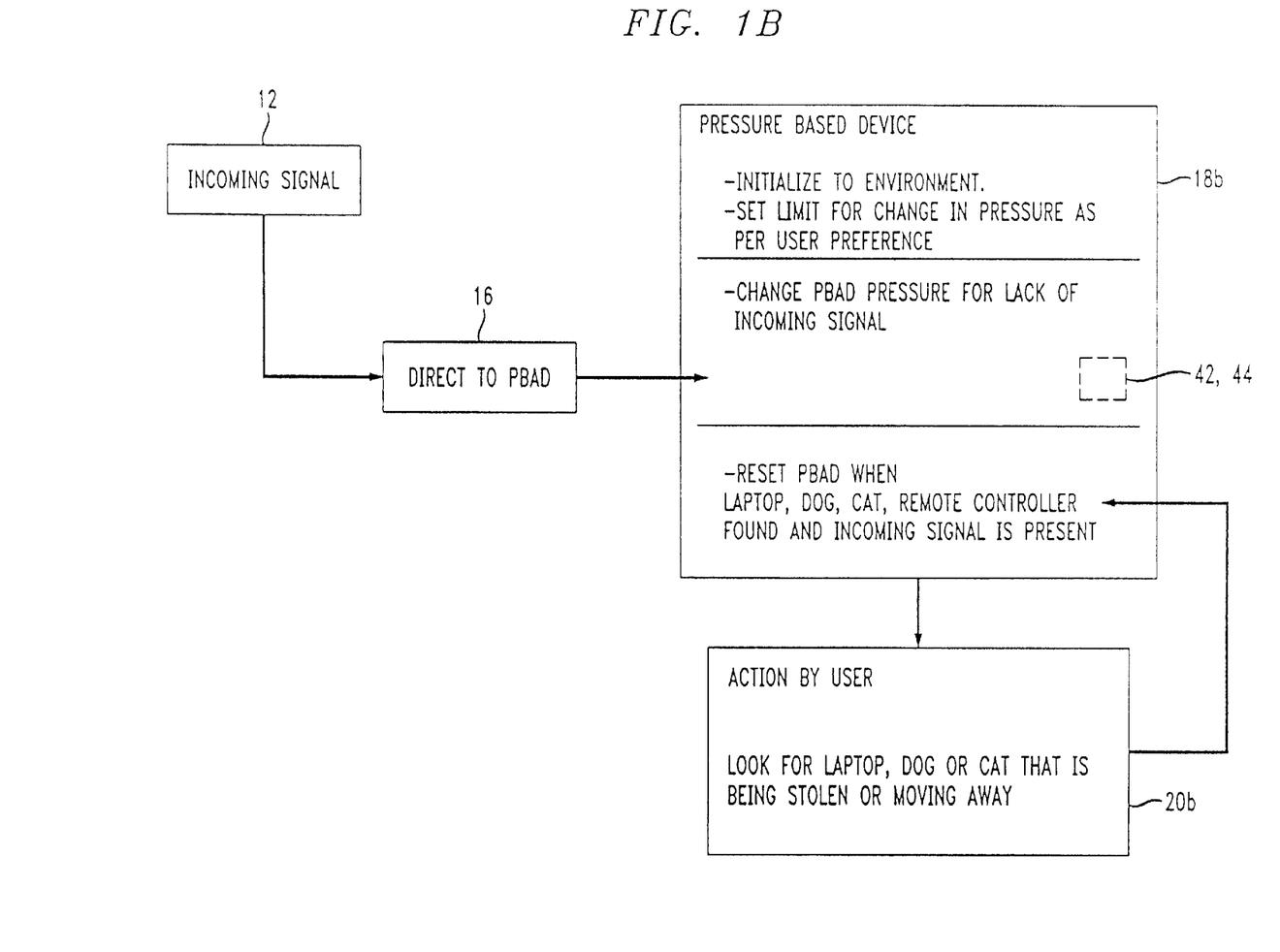
FIG. 1b is a diagrammatic representation of a method for generating pressure based alerting signals in accordance with another embodiment of the invention.
Figure 2:
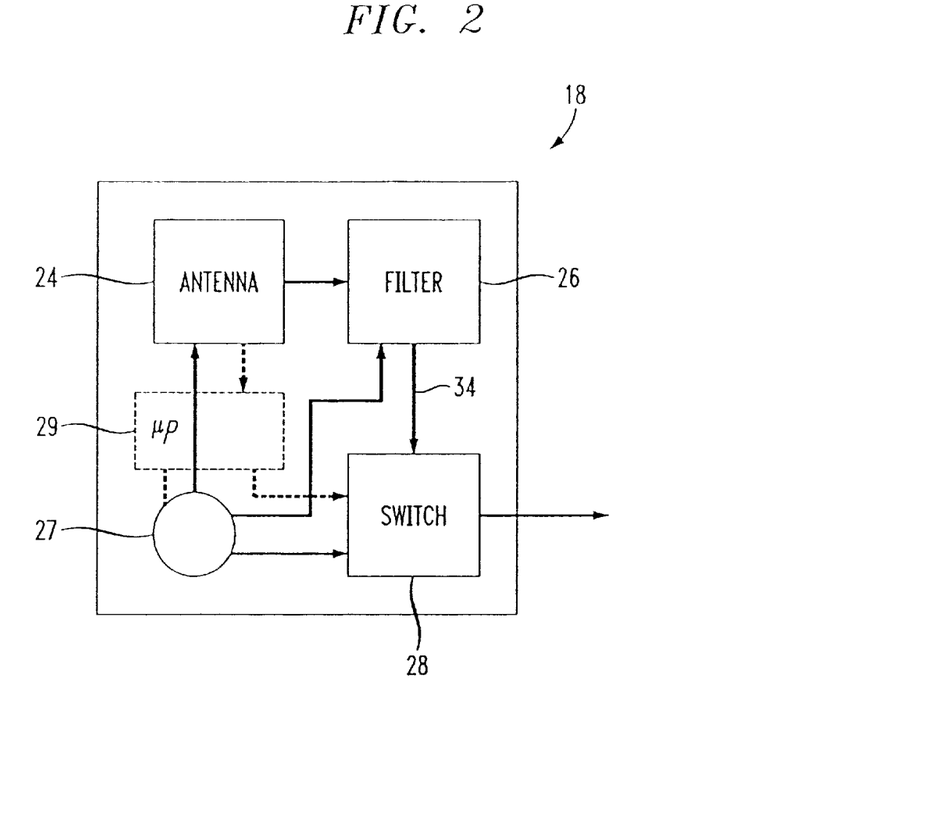
FIG. 2 is a block diagram of circuitry for the pressure based alerting device according to an embodiment of the present invention.

FIG. 2 depicts a block diagram of PBAD 18 in accordance with an embodiment of the invention. PBAD 18 includes an antenna 24 for receiving control signal S1 from the inserting device 15 or the incoming signal 12 directly (16) from its source. Antenna 24 is preferably a thin film internally arranged within PBAD 18 so that the PBAD can be implemented in various different form functions and structures as discussed hereinbelow. The received signal is processed by filter 26 which is adapted to reduce noise in the operating bandwidth. The filtered signal is fed to switch 28 which activates the bi-metal plates (FIG. 4) in contact with the user's skin. Switch 28 can be, for example, an operational amplifier, a relay or other electronic or mechanical switch for passing battery power to at least one of the upper and lower bi-metal plates to cause it to buckle and apply pressure to the user's skin. In other contemplated embodiments, PBAD 18 may include a microprocessor 29 that is connected to antenna 24, battery 27 and switch 28. Microprocessor 29 is operable to enable a monitoring embodiment of the present invention (discussed hereinbelow with reference to FIGS. 1b, 5a and 5b) by determining the cyclic or repetitive presence of an incoming signal and sending a control signal to switch 28 in the absence of an incoming signal.

A battery 27 is connected to the antenna 24, filter 26, microprocessor 29 and switch 28 to provide necessary operating power to these devices and to a current signal to the bi-metal plates 42, 44 in response to the closing of switch 28, causing the bi-metal plates to buckle and thereby apply notifying pressure to the user. Battery 27 is a miniature battery known in the art such as, for example, a solid state rechargeable thin film battery, a planar micro battery, lithium coin cells, thin film lithium battery, etc. The type of battery implemented and size thereof is a matter of design choice, and is dependent on the article in which alerting device 18 is incorporated.

Figure 3:
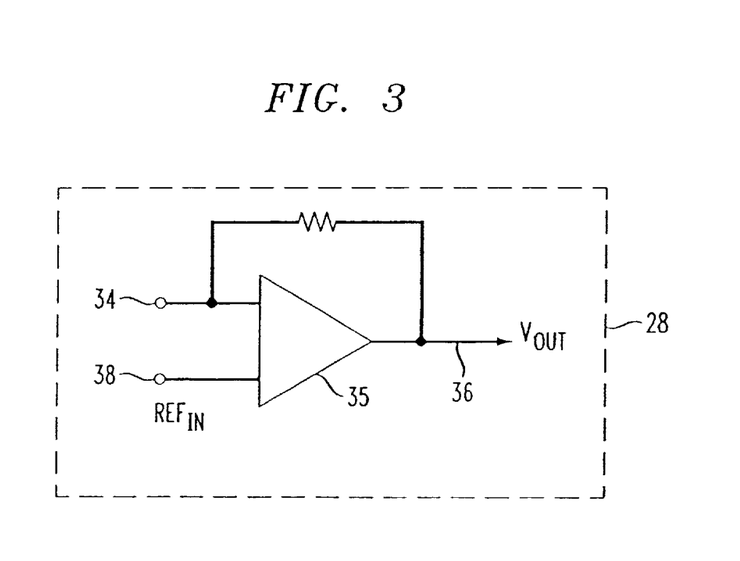
FIG. 3 is a schematic diagram of an operational amplifier implementation of the switch for the pressure based alerting device according to an embodiment of the invention.

FIG. 3 depicts a schematic diagram of an operational amplifier configuration of switch 28. As shown, switch 28 may be implemented using an operational amplifier 35 having a predetermined gain, a reference input 38 that is connected to the user's body or a preset reference pressure signal to provide a reference input, and another input 34 that receives the incoming signal via filter 26 (FIG. 2). Upon receipt of an incoming signal in the form of a predetermined frequency via input 34, operational amplifier 35 develops an output current signal 36 that is fed to the upper plates 42a, 42b (FIG. 4). Upon discontinuation of the incoming signal applied to input 34, opamp 25 discontinues its current signal output, and the buckling 46a, 46b of upper plates 42a, 42b, is discontinued or deactivated. The discontinuation of the incoming signal can result from the user answering the call or page, or from the calling party terminating the incoming call before the user answers it. The reference input 38 can be provided by microprocessor 29 as is preset according to a particular design choice for a predetermined application or user, or may be dynamically adapted as a function of the ambient pressure of the surrounding environment. One of ordinary skill in the art will recognize that switch 28 can be a simple relay, an IC switch or another logic switch that enables the passing of current to the bi-metal plates upon receipt of a control signal indicating the presence of an incoming signal.

The PBAD 18 can be implemented in many different objects such as a jewelry ring or necklace or armband, clothing, or any other device that is designed to rest or come into contact with the user's skin. In addition, it is contemplated that PBAD 18 may be a self-contained device that can be removably or detachably fastened to different items or people. In a fixed position configuration, the size and shape of the object in which the PBAD 18 is implemented is left to the imagination of fashion and jewelry designers. Some other objects that are contemplated by the present invention are finger rings, ear rings, bangle bracelets, shirts, pants, shoes, wrist watches, pocket watches, neck-ties, neck-tie pins, anklets, belt buckles, dress buttons, pens, necklaces, etc. In other contemplated embodiments, by way of example for animals, the TSAD can be implemented in the animal's collar.

FIGS. 4a and 4b show a ring 25 having the PBAD 18 implemented therein and including upper plates 42a, 42b suspended over the a lower plate portion 44 of the ring band. The upper plates 42a, 42b in conjunction with the lower plate portion 44 form a bi-metal plate capable of reacting to applied RF energy. The upper plates 42a, 42b in contact with the user's body (via the finger) receive control signal S1 from inserting device 15 (FIG. 1a) or, alternatively, receive the incoming RF signal 12 directly. Thus, when an incoming call is received, the RF energy is either applied directly to PBAD 18, which causes switch 28 to be closed and a current signal to be applied to the upper plates 42a, 42b or indirectly by inserting device 15 and control signal S1 while the lower plate or portion 44 is cold as a result of the lack of physical contact with the user. The application of a current signal or RF energy in the form of RF pulses to the upper plates 42a, 42b at a predetermined frequency generated either by inserting device 15 or directly from incoming signal 12 causes a current to flow into upper plates 42a, 42b which results in their heating up with respect to the lower plate portion 44. The heating of upper plates 42a, 42b causes them to buckle at 46a, 46b, respectively, and thereby creates a physical pressure spot in contact with the user's body. Thus, when an incoming call is received the user is alerted to its presence by the pressure applied to their skin by the buckling 46a, 46b of the respective plates 42a, 42b.

Figure 6:
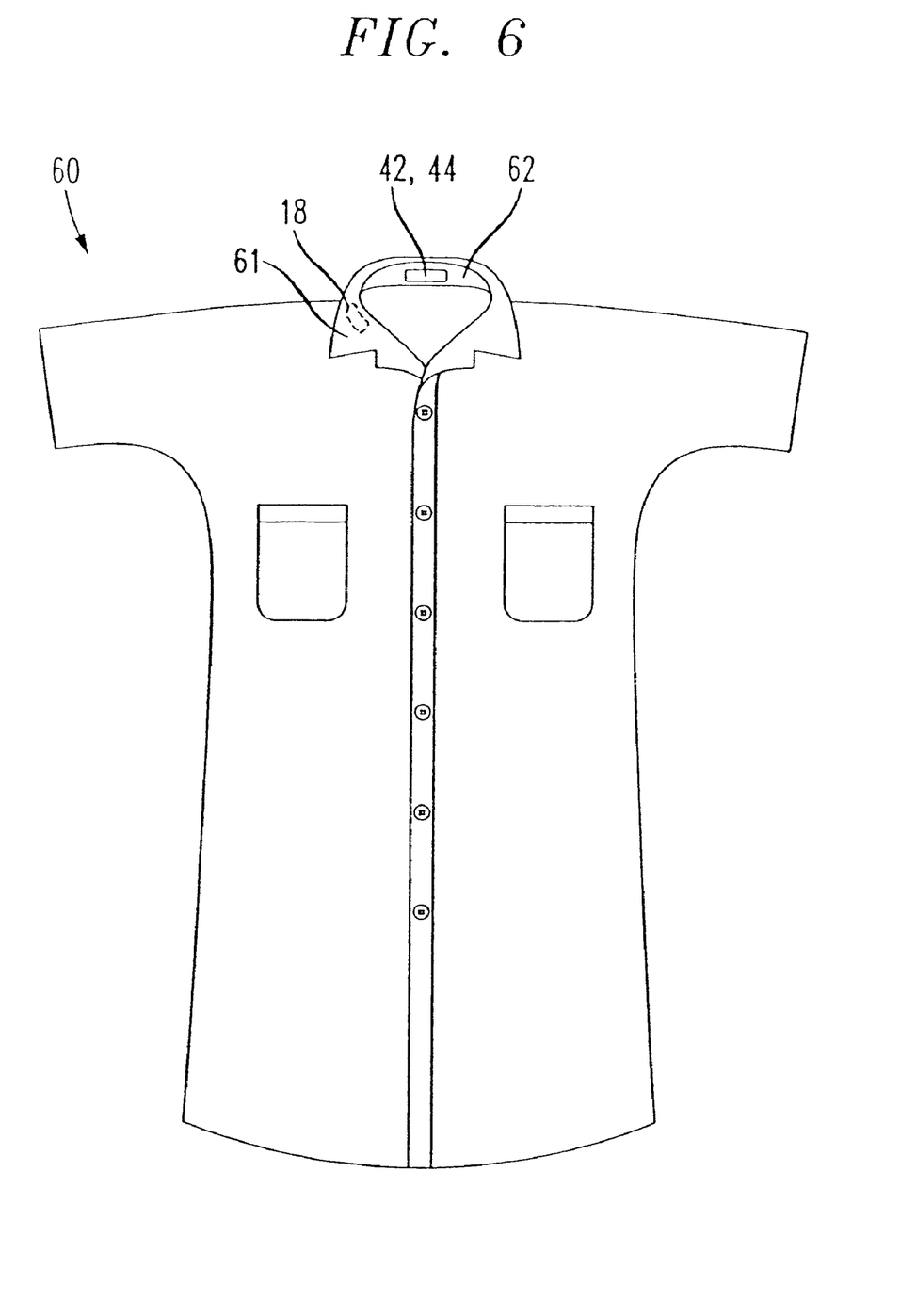
FIG. 6 is a front view of an article of clothing incorporating the pressure based alerting device according to an embodiment of the invention.

FIG. 6 depicts an exemplary embodiment in which an article of clothing houses the pressure based alerting device 18 of the present invention. Shirt 60 has the pressure based alerting device 18 located under the collar 61 and the bi-metal plates 42, 44 disposed on the back 62 of collar 61 so that the plates remain contact with the user's neck when the shirt is worn.

In a further embodiment diagrammatically shown in FIG. 1b, PBAD 18b may be used to alert the user as to the presence, or more particularly to the absence of an object, animal or person. For example, a transmitter can provide PBAD 18b with an RF signal on a cyclic or repetitive basis. In this embodiment, the user device 14 (FIG. 1a) is not required for communicating the presence or lack of presence of the incoming signal 12. As described previously, PBAD 18b can include a microprocessor 29 (FIG. 2) that enables monitoring of the presence of the RF signal (i.e. of incoming signal 12). When the presence of an RF signal is not detected for a predetermined period of time (e.g. 1–30 second), PBAD 18b can alert the user by changing the pressure of the attached bi-metal plates. The lack of detection of the RF signal (incoming signal) will generally result from movement of the object, person, or animal from which the transmission emanates outside of the predetermined range. Once the user has been alerted to the lack of detection of an incoming RF signal via the pressure change in the bi-metal plates (FIGS. 4a and 4b), the user can proceed to attempt to locate the transmitting device. When the user is once again within the range of the transmitting device, the TSAD 18b receives the RF signal and resets itself to its initial pressure. Examples of contemplated objects for tracking are a portable computer, remote control devices, and any other readily movable object that the user desires to monitor for presence. This presence monitoring embodiment can also be used to monitor the proximity of a child or animal, with the child or animal being provided with a transmitter that transmits the RF signal 12 for monitoring by the TSAD 18b.

Figure 5A:
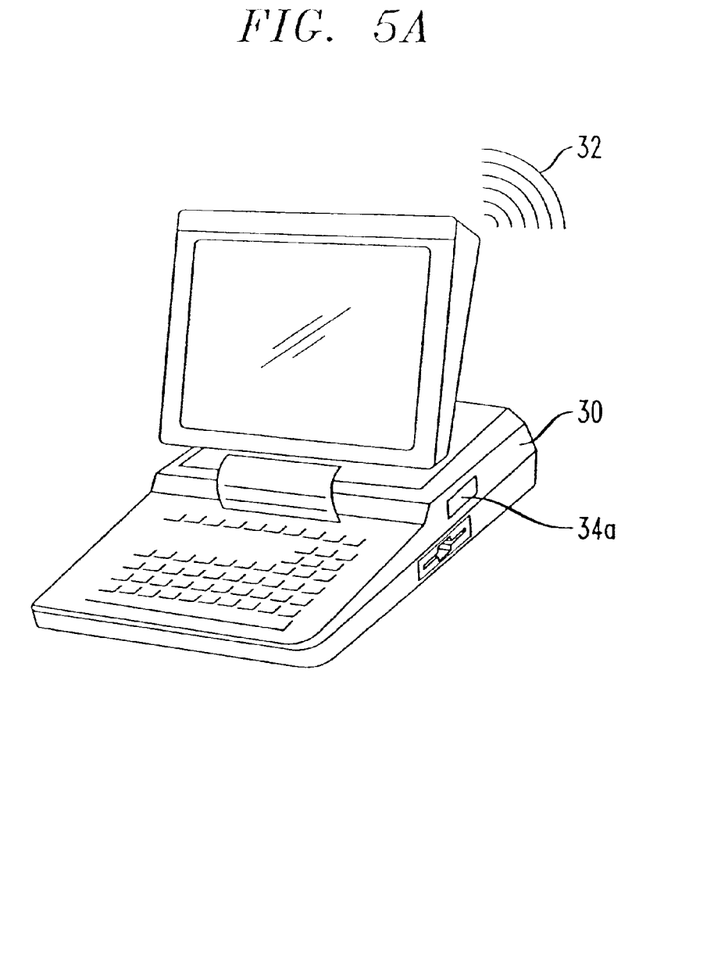
FIG. 5a is a perspective view of a computer as implemented in the device for generating pressure based alerting signals according to an embodiment of the present invention.

Referring now to FIG. 5a, a transmitter 34a is shown attached to a portable laptop type computer 30. Transmitter 34a can be externally attached to computer 30 or disposed internally so that it transmits RF signals 32 of a predetermined frequency & format (e.g. pulse, continuous, etc.) that PBAD 18b is adapted to receive. The transmission of signals 32 can be intermittent or cyclic, based on a predetermined timing scheme. In this embodiment, PBAD 18b is adapted to receive the intermittent or cyclic signals and generates a current signal to activate the bi-metal plates only when the intermittent or cyclic signals are not received for a predetermined period of time. Through the transmission of RF signals at predetermined time periods, the PBAD 18b performs a monitoring function for alerting the user as to the absence of the RF signals and, correspondingly, of the absence of the object, person or animal being monitored.

Figure 5B:
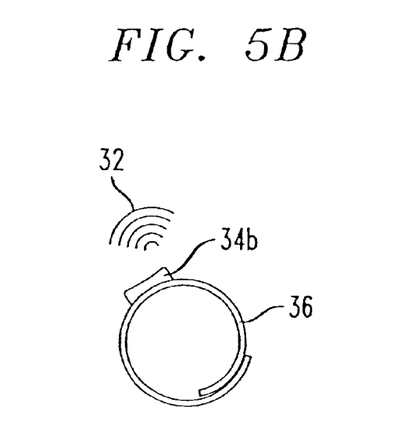
FIG. 5b is a plan view of a releasable strap having a transmitter for use in the generation of pressure based alerting signals according to an embodiment of the invention.

FIG. 5b shows a strap 36 having a transmitter 34b mounted thereon. Strap 36 can be releasably attached to an object, child or animal so as to provide transmitting signals 32 to the PBAD 18b. When the transmitter 34b is thus attached to an animal or child via strap 36, person watching after the child or animal can monitor its presence within a specified variable range of the transmitter 34b and PBAD 18b. In this embodiment, PBAD 18b may as before be implemented either in a piece of jewelry or clothing or in a releasable device worn by the user, and the transmitter 34b can be attached to an object, animal, or person to be monitored in any convenient manner.

It is contemplated herein that PBAD can be incorporated into many different known items whose size and shape may be variably configured in accordance with the desired application. Such items may for example be any and all types of jewelry, such for example as finger rings, earrings, necklaces, bracelets, wrist watches; clothing such as hats, caps, shirts, pants, shoes, shoe soles, socks; and other articles such as a pen or a pencil. In this monitoring embodiment, the PBAD 18 can be configured to be portable for ease of releasable transfer from one source to another, such as a pet or a child.

While there have shown and described and pointed out fundamental novel features of the invention as applied to preferred embodiments thereof, it will be understood that various omissions and substitutions and changes in the form and details of the methods disclosed and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A method for generating pressure based alerting signals for alerting a user as to the occurrence of a predetermined event comprising steps of:
   providing a pressure based alerting device comprising a pressure actuator having at least one part in communication with the user's skin and a lower plate;
   initializing the pressure actuator such that it exerts a first predetermined pressure on the user's skin in an unactivated state;
   setting a pressure change limit for the pressure based alerting device;
   changing the pressure exerted by the pressure actuator on the user's skin from the first predetermined pressure to a second predetermined pressure in an activated state to notify the user of the occurrence of the predetermined event whereas the second predetermined pressure is continuously exerted on the user's skin; and
   resetting the pressure of the pressure actuator to the first predetermined pressure when the user has responded to the occurrence of the predetermined event.

2. The method set forth in claim 1, wherein said predetermined event comprises receiving an incoming communication signal from an outside source and said user response comprises answering the incoming communication signal.

3. The method set forth in claim 2, wherein said incoming communication signal is designated for at least one of a wireless telephone and a paging device.

4. The method set forth in claim 3, further comprising generating a wireless control communication signal to be transmitted by the at least one of the telephone and the paging device to the pressure based alerting device for activating said at least one portion to change its pressure from the first predetermined pressure to the second predetermined pressure.

5. The method set forth in claim 2, further comprising applying the incoming communication signal directly to the pressure based alerting device to cause it to change its pressure from the first predetermined pressure to the second predetermined pressure.

6. The method set forth in claim 1, further comprising:
   providing a transmitting device remote from the alerting device for transmitting wireless communication signals on a predetermined repetitive basis; and
   monitoring at the pressure based alerting device the presence of the transmitted wireless communication signals;
   wherein said predetermined event comprises determining an absence of the wireless communication signals for a predetermined period of time, and said user response comprises locating the transmitting device such that the pressure based alerting device is within a transmitting range of the transmitting device.

7. The method set forth in claim 1, wherein said step of providing comprises implementing the pressure based alerting device with said at least one portion into a piece of jewelry worn by the user.

8. The method set forth in claim 1, wherein said step of providing comprises implementing the pressure based alerting device with said at least one portion into clothing worn by the user.

9. The method set forth in claim 6, wherein said transmitter is provided so as to be releasably attached to one of an object, a person and an animal for enabling the user to monitor a general location of the object, person or animal.

10. The method set forth in claim 1, wherein said pressure actuator comprises a bi-metallic element having an upper plate and a lower plate, one of said upper and lower plates being in contact with the user's skin.

11. An apparatus for generating pressure based alerting signals to a user in response to incoming communication signals designated for a wireless communication device comprising:
   a pressure based alerting device having a power source, a switch element coupled to said power source and a pressure actuator coupled to said switch element and having at least one portion in communication with the user's skin; and means for applying a control signal to said pressure based alerting device in response to a received incoming communication signal to cause said switch element to close and apply a current signal to said pressure actuator causing said pressure actuator to change shape as a result of the applied current signal thereby applying pressure to the user's skin and alerting the user as to the presence of the incoming communication signal.

12. The apparatus in accordance with claim 11, wherein said pressure based alerting device further comprises an antenna for receiving said control signal.

13. The apparatus in accordance with claim 12, wherein said means for applying comprises an inserting device operably connected with the wireless communication device and for generating said control signal in response to the received incoming communication signal and disabling an audible alert signal produced by the wireless communication device.

14. The apparatus in accordance with claim 13, wherein said pressure based alerting device further comprises a microprocessor for controlling the pressure based alerting device.

15. The apparatus in accordance with claim 14, wherein said control signal comprises the incoming communication signal received directly by said antenna, said microprocessor controlling said switch to close in response to the received incoming communication signal.

16. The apparatus in accordance with claim 14, wherein said switch element comprises an operational amplifier having a signal input for receiving said control signal, a reference input, and an output for outputting said control current signal to said pressure based alerting device.

17. The apparatus in accordance with claim 16, wherein said microprocessor provides a reference signal representing a reference pressure to be applied to said reference input.

18. An apparatus for generating pressure based alerting signals to alert a user as to the occurrence of a predetermined event comprising:

a pressure based alerting device having a power source, a switch element coupled to said power source and a bi-metallic element coupled to said switch element and having upper and lower plates, wherein one of said upper and lower plates are in contact with the user's skin;

transmitting means for transmitting communication signals to said pressure based alerting device on a repetitive basis; and means for controlling said switch element to close and thereby provide power to activate said bi-metallic element in response to an absence of received incoming communication signals for a predetermined period of time.

19. The apparatus in accordance with claim 18, wherein said closing of the switch element applies a current signal to one of the upper or lower plates in contact with the user's skin, said one of the upper or lower plates changing shape as a result of the applied current signal thereby applying pressure to the user's skin and alerting the user as to absence of the incoming communication signal.

* * * * *